(12) United States Patent
Moriyama

(10) Patent No.: US 8,774,456 B2
(45) Date of Patent: Jul. 8, 2014

(54) DETECTIVE INFORMATION REGISTRATION DEVICE AND TARGET OBJECT DETECTION DEVICE FOR DETECTING AN OBJECT IN AN IMAGE

(75) Inventor: Kozo Moriyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 226 days.

(21) Appl. No.: 13/058,300

(22) PCT Filed: Aug. 6, 2009

(86) PCT No.: PCT/JP2009/003767
§ 371 (c)(1),
(2), (4) Date: Feb. 9, 2011

(87) PCT Pub. No.: WO2010/018669
PCT Pub. Date: Feb. 18, 2010

(65) Prior Publication Data
US 2011/0142286 A1    Jun. 16, 2011

(30) Foreign Application Priority Data
Aug. 11, 2008   (JP) .................................. 2008-207259

(51) Int. Cl.
*G06K 9/00*   (2006.01)
(52) U.S. Cl.
USPC ........................................................ 382/103
(58) Field of Classification Search
USPC .......................... 382/100–107; 348/169–171
See application file for complete search history.

(56) References Cited

U.S. PATENT DOCUMENTS

| | | |
|---|---|---|
| 2001/0038714 A1 | 11/2001 | Masumoto et al. |
| 2002/0001398 A1 | 1/2002 | Shimano et al. |
| 2008/0008361 A1 | 1/2008 | Nozaki et al. |

FOREIGN PATENT DOCUMENTS

| | | |
|---|---|---|
| CN | 1801930 A | 7/2006 |
| JP | 06-231252 A | 8/1994 |
| JP | 06-274625 A | 9/1994 |
| JP | 08-016987 A | 1/1996 |
| JP | 2001-307096 A | 11/2001 |
| JP | 2002-83297 A | 3/2002 |
| JP | 2003-346158 A | 12/2003 |
| JP | 2006-155167 A | 6/2006 |
| JP | 2007-135501 A | 6/2007 |
| JP | 2007-282119 A | 10/2007 |

OTHER PUBLICATIONS

Office Action for Chinese Application No. 200980128887.X dated Nov. 20, 2012, with English translation thereof (10 pages).
Patent Abstract of Chinese Publication No. 1801930 published Jul. 12, 2006 (1 page).
International Search Report w/translation from PCT/JP2009/003767 dated Nov. 2, 2009 (6 pages).
Written Opinion from PCT/JP2009/003767 dated Nov. 2, 2009 (5 pages).
Liu Fu-xin et al., "Application of modified Hausdorff distance in human face match," Computer Engineering and Applications, 2007, 43(35), pp. 169-171 and translation thereof (13 pages).

*Primary Examiner* — Atiba O Fitzpatrick
(74) *Attorney, Agent, or Firm* — Osha Liang LLP

(57) ABSTRACT

A digital camera that includes: a storage section, a frame image obtaining section, and a characterizing point extracting section for extracting tracking-purpose characteristic information from the frame image and storing the tracking-purpose characteristic information into the storage section. The tracking-purpose characteristic information being information for tracking and characterizing a target object included in a moving image. The digital camera also includes a tracked object area calculating section, a detective feature extracting section, and a registration section for registering a part or all of the detective characteristic information.

5 Claims, 12 Drawing Sheets

(a)

(b)

(a)

(b)

(c)

DETECTIVE INFORMATION REGISTRATION DEVICE AND TARGET OBJECT DETECTION DEVICE FOR DETECTING AN OBJECT IN AN IMAGE

TECHNICAL FIELD

The present invention relates to a device that performs at least either one of registration and detection of an object, in particular, to a detective information registration device for registration of information of an object, a target object detection device for detecting an object according to registered information, an electronic device, a method of controlling the detective information registration device, a method of controlling the target object detection device, a control program for the detective information registration device, and a control program for the target object detection device.

BACKGROUND ART

In recent years, in an image pickup device such as a digital steel camera or a digital video camera, needs for automatic recognition of an object whose image is to be captured are increasing. Such needs are for obtaining an optimum image. For example, there is a digital camera that has a function to automatically detect a human face and adjust a focus and/or exposure so that the focus and/or exposure is optimum for the detected human face.

Further, in capturing an image by a camera, there are many chances in which an animal such as a pet is an object whose image is to be captured. Accordingly, as in detection of a human face, a function to automatically detect an animal whose image is to be captured and to correct a focus and/or exposure is required.

Though the current technique has reached a practical level in a technique for detection of a human face, a technique for detecting an animal other than a human being is limited. The following appears to be one reason for this situation. That is, in a case where some object whose image is to be captured is to be detected, first, it is required to define characteristics of the object in advance. In regard to this point, human faces have many common characteristics and therefore are easily defined. On the other hand, as compared to human beings, animals are diverse, and it is difficult to define characteristics of animals in advance. For example, a case where a dog is to be defined is considered here. Though classified into one kind, i.e., "dog", dogs differ from one another in shapes of faces and bodies, colors, lengths of hairs, shapes of ears depending on kinds. The difference between dogs is greater than difference between human beings. Therefore, it is difficult to define characteristics of dogs in advance. Consequently, it is difficult to automatically detect dogs that cannot be defined in advance. Further, in consideration of a situation in which an image is captured, unlike human beings, animals do not always face front toward a person who is to capture the image. Animals may face in various directions and take various poses. This point also makes automatic recognition of animals technically more difficult.

The followings are techniques for automatic recognition of an object. Patent Literature 1 discloses a technique to perform various processes based on information of a recognized object whose image is to be captured, in an electronic camera including a function of face recognition.

Patent Literature 2 discloses a technique to detect a position at which an object is present, a type of the object, and a rough distance to the object. The detection is carried out by inputting images captured by a plurality of cameras into one common image processing device and checking the images captured by the cameras with model data registered in a database in the image processing device.

Further, Patent Literature 3 describes a technique according to which a change in appearance of an object is predicted so that a model is formed, and input image information is checked with model data.

Patent Literature 4 discloses a technique in an image recognition device that detects a detection object that is present in an observation space according to which technique, in a case where a change occurs in a background image and an input image, it is determined whether or not the change is caused by a small animal by use of a small animal indicator.

Patent Literature 5 discloses a technique according to which a car is recognized by thermal imaging and a type of the car is determined/classified.

Patent Literature 6 discloses a technique for creating information for identifying an animal by extracting an outline of a nose and respective outlines of two nostrils from an image of a whole nose of the animal.

CITATION LIST

Patent Literature

Patent Literature 1

Japanese Patent Application Publication, Tokukai, No. 2007-282119 (published on Oct. 25, 2007)

Patent Literature 2

Japanese Patent Application Publication, Tokukai, No. 2002-83297 (published on Mar. 22, 2002)

Patent Literature 3

Japanese Patent Application Publication, Tokukai, No. 2001-307096 (published on Nov. 2, 2001)

Patent Literature 4

Japanese Patent Application Publication, Tokukai, No. 2006-155167 (published on Jun. 15, 2006)

Patent Literature 5

Japanese Patent Application Publication, Tokukaihei, No. 8-16987 (published on Jan. 19, 1996)

Patent Literature 6

Japanese Patent Application Publication, Tokukai, No. 2007-135501 (published on Jun. 7, 2007)

SUMMARY OF INVENTION

Technical Problem

However, in the conventional configuration, the following problems occur. That is, the technique disclosed in Patent Literature 1 is for authenticating human faces. Accordingly, because it is difficult in the first place to define animals in advance as described above, it is difficult to detect animals in the same manner as human faces.

In a case where the technique disclosed in Patent Literature 2 is applied to animals, it is required to register an enormous amount of model data. Further, in the registration, registration of data in various directions and various positions is required. However, a user cannot find specific orientations, positions, amounts of model data in the orientations and positions each of which is required to be registered. Therefore, the registration is not easy for the user.

In the technique disclosed in Patent Literature 3, a modeling is carried out at registration. Accordingly, precise calculation of information of image capture environment (e.g., orientations and/or posses) is required. Therefore, it is required to clip out an object. However, to clip out an object from a static image is difficult and troublesome. Therefore, the registration is not easy.

The present invention is attained in view of the above problems. An object of the present invention is to realize a detective information registration device that is a device allowing a user to easily register an animal which is to be a detection target, a target object detection device that is a device detecting the animal registered from an inputted image, and the like.

Solution to Problem

In order to solve the above problem, a detective information registration device of the present invention for registering detective characteristic information that is information for detecting target objects included in a moving image captured and that is also information characterizing the target objects, the detective information registration device includes: a storage section for storing information; image obtaining means for obtaining a frame image in the moving image; tracking-purpose characteristic extracting means for extracting tracking-purpose characteristic information from the frame image and storing the tracking-purpose characteristic information into the storage section, the tracking-purpose characteristic information being information for tracking a target object included in the moving image captured and also being information characterizing the target object; target object area detecting means for detecting an image area of the target object, based on a change between the tracking-purpose characteristic information extracted by the tracking-purpose characteristic extracting means and the tracking-purpose characteristic information relevant to the frame image stored in the past into the storage section; detective characteristic extracting means for extracting the detective characteristic information from the image area of the target object, the image area being detected by the target object area detecting means; and detective characteristic registration means for registering, into the storage section, a part or all of the detective characteristic information extracted by the detective characteristic extracting means.

A method of the present invention for controlling a detective information registration device for registering detective characteristic information that is information for detecting a target object included in a moving image captured and that is also information characterizing the target object, the method includes the steps of: (a) obtaining a frame image in the moving image; (b) extracting tracking-purpose characteristic information from the frame image and storing the tracking-purpose characteristic information into a storage section, the tracking-purpose characteristic information being information for tracking the target object included in the moving image captured and also being information characterizing the target object; (c) detecting an image area of the target object, based on a change between the tracking-purpose characteristic information extracted in the step (b) and the tracking-purpose characteristic information relevant to the frame image stored in the past into the storage section; (d) extracting the detective characteristic information from the image area of the target object, the image area being detected in the step (c); and (e) registering, into the storage section, a part or all of the detective characteristic information extracted in the step (d).

According to the above configuration and the method, a frame image is obtained from a moving image. Then, from the frame image obtained, tracing-purpose characteristic information for tracing a target object in the moving image is extracted and stored in the storage section. Then, an image area of the target object is detected based on a change between past tracking-purpose characteristic information stored in the storage section and current tracking-purpose characteristic information. Then, detective characteristic information is extracted from the image area of the target object and stored in the storage section.

As a result, only by capturing a moving image of a target object, detective characteristic information for detecting the target object is registered. Therefore, a characteristic of the target image can be easily registered.

The detective information registration device of the present invention, further includes: in-motion change amount calculating means for calculating a change amount in motion in the frame image of the target object, based on (i) the change between the tracking-purpose characteristic information extracted by the tracking-purpose characteristic extracting means and the tracking-purpose characteristic information relevant to the frame image stored in the past into the storage section and (ii) information of the area of the target object; similarity level calculating means for calculating a similarity level between the detective characteristic information extracted by the detective characteristic extracting means and detective characteristic information stored in the storage section; adequacy level calculating means for calculating an adequacy level based on (i) the change amount in motion which change amount is calculated by the in-motion change amount calculating means and (ii) the similarity level calculated by the similarity level calculating means, the adequacy level indicating a level of an mount of detective characteristic information stored in the storage section with respect to an amount of detective characteristic information which amount is predicted to be necessary for detecting the target object from any captured image obtained by capturing an image of an object including the target object.

According to the above configuration, the in-motion change amount calculating means calculates a change amount in motion in the frame image of the target object, based on a change between the tracking-purpose characteristic extracting means extracted by the tracking-purpose characteristic extracting means and tracking-purpose characteristic information relevant to a past frame image stored in the storage section, and information of the target object area detected by the target object area detecting means. Then, the adequacy level calculating means calculates an adequacy level, based on the change amount in motion which change amount is calculated by the in-motion change amount calculating means and a similarity level calculated by the similarity level calculating means.

Here, an example of the change amount in motion is a displacement or a shift amount in orientation.

As a result, the adequacy level is calculated. The adequacy level indicates a level of an amount of detective characteristic information stored, with respect to an amount of detective characteristic information which amount is predicted to be necessary for detection of the target object.

Accordingly, for example, by notifying the adequacy level, it is possible to encourage a user in registration of detective characteristic information up to an amount of the detective characteristic information which amount is predicted to be necessary for detection of the target object.

The detective information registration device of the present invention may be configured to further include: initial position obtaining means for obtaining in advance information of an initial position of the target object in the moving image and storing the information into the storage section, wherein: the tracking-purpose characteristic extracting means and the target object area detecting means utilizes the information of the initial position stored in the storage section for an initial frame image obtained by the image obtaining means.

According to the above configuration, the initial position obtaining means obtains information on an initial position of the target object in advance and stores the information into the storage section. Then, the tracking-purpose characteristic extracting means and the target object area detecting means utilizes the information on the initial position stored in the storage section for an initial frame image obtained by the image obtaining means.

As a result, the initial position of the target object is specified in advance. Accordingly, the tracking-purpose characteristic extracting means and the target object area detecting means can more precisely detect an area where the target object is present.

It is preferable that the detective information registration device of the present invention, further includes: common characteristic specifying means for specifying one piece or a plurality of pieces of detective common characteristic information that is common to all or a part of a plurality of pieces of the detective characteristic information stored in the storage section, wherein: the detective characteristic registration means further registers, in the storage section, detective common characteristic information specified by the common characteristic specifying means.

According to the above configuration, the common characteristic specifying means specifies one piece or a plurality of pieces of detective common characteristic information that is common to all or a part of a plurality of the detective characteristic information stored in the storage section. Then, the common characteristic specifying means stores, into the storage section, the detective common characteristic information specified.

This makes it possible to use detective common characteristic information when necessary.

For example, in a case where a target object is to be detected, the use of the detective common characteristic information makes it possible to detect, from an entire image, an area where it is highly possible that the target object is present.

In the detective information registration device of the present invention, it is preferable that: the detective characteristic information stored in the storage section is stored so as to be associated with identification information for identifying a plurality of the target objects.

According to the above configuration, the detective characteristic information is stored so that the detective characteristic information is associated with identification information for identifying a plurality of the target objects.

This makes it possible to register a plurality of target objects.

In order to solve the problem mentioned above, a target object detection device of the present invention for detecting a target object included in a moving image captured, the detective information registration device includes: a storage section for storing (i) a plurality of pieces of detective characteristic information that is information for detecting the target object and also information characterizing the target object and (ii) one piece or a plurality of pieces of detective common characteristic information that is common to all or a part of the plurality of pieces of detective characteristic information; image obtaining means for obtaining a frame image in the moving image; detective characteristic extracting means for extracting detective characteristic information from the frame image obtained by the image obtaining means; candidate area searching means for searching an area having detective characteristic information similar to the detective common characteristic information as an area where it is possible that the target object is present in the frame image, the candidate area searching means searching the area by use of the detective characteristic information extracted by the detective characteristic extracting means and the detective common characteristic information in the storage section; similarity level calculating means for calculating a similarity level of the detective characteristic information of the candidate area searched by the candidate area searching means and the detective characteristic information in the storage section; and determination means for determining whether the candidate area is an area where the target object is present in the frame image, based on the similarity level calculated by the similarity level calculating means.

Further, a method of the present invention for controlling a target object detection device for detecting a target object included in a moving image captured, the method includes the steps of: (a) obtaining a frame image in the moving image; (b) extracting detective characteristic information from the from image obtained in the step (a); (c) searching an area having detective characteristic information similar to one piece or a plurality of pieces of detective common characteristic information as an area where it is possible that the target object is present in the frame image, the step of searching being carried out by use of the detective characteristic information extracted in the step (b) and one piece or a plurality of pieces of detective common characteristic information that is common to a part or all of a plurality of pieces of detective characteristic information, the plurality of pieces of detective characteristic information being information stored in a storage section and characterizing the target object; (d) calculating a similarity level between the detective characteristic information included in the candidate area searched in the step (c) and the detective characteristic information stored in the storage section; and (e) determining whether the candidate area is an area where the target object is present in the frame image, based on the similarity level calculated in the step (d).

According to the above configuration and method, by using one piece or a plurality of pieces of detective common characteristic information that is common to a part or all of a plurality of pieces of detective characteristic information that is information stored in the storage section and that also characterizes a target object, a candidate area is searched. The candidate area is in a frame image obtained from a moving image captured and has detective characteristic information similar to the detective common characteristic information.

Then, a similarity level between detective characteristic information of the candidate area searched and the above-mentioned detective characteristic information is calculated. Based on the calculated similarity level, whether or not the candidate area is an area where the target object is present is determined.

As a result, an area having detective characteristic information similar to the detective characteristic information stored in the storage section can be determined to be the area where the target object is present.

For example, a case where detective characteristic information of a domesticated dog of a user is registered is assumed. In such a case, when an image is captured by the target object detection device, an area where the domesticated dog is present can be detected if the domesticated dog is present within an image capture range.

The target object detection device of the present invention further includes: tracking means for tracking an area where a desired object is present.

According to the above configuration, the tracking means tracks an area where a desired object is present. This makes it possible to continue detecting the area where the desired object is present without making another detecting operation, if once an area where the desired object is present is detected.

An electronic device including the detective information registration device and the target object detection device can provide the effect described above.

The electronic device of the present invention may include notification means for performing notification to a user, according to an adequacy level calculated by the adequacy level calculating means.

As a result, notification to a user according to the adequacy level is performed. This allows the user to carry out a process based on the adequacy level.

For example, it may be arranged such that if the adequacy level calculated by the adequacy level calculation means exceeds a preset threshold, the notification means notifies a user that registration can be completed. In this case, the user can recognize that a feature is stored to an extent that makes it possible to specify a registration target object.

Here, a value of the preset threshold is defined as follows. That is, when the adequacy level exceeds the value of the preset threshold, a feature stored in the feature storage section becomes sufficient for specifying the target object.

Further, when the adequacy level calculated by the adequacy level calculating means does not exceed the preset threshold, the notification means may notify, to the user, at least either that the adequacy level does not exceed the preset threshold or an instruction for an operation required to cause the adequacy level to exceed the preset threshold. As a result, in a case where the adequacy level does not exceed the threshold, the user can recognize at least either that the adequacy level does not exceed the preset threshold or the instruction for the operation required to cause the adequacy level to exceed the preset threshold.

Note that the detective information registration device and the target object detection device may be realized by a computer. In such a case, the present invention encompasses a control program for the detective information registration device which control program is for realizing the detective information registration device by a computer by causing the computer to function as the above described means and a control program for the target object detection device which control program is for realizing the target object detection device by a computer by causing the computer to function as the above described means. The present invention also encompasses a computer-readable storage medium recording the control program for the detective information registration device and the control program for the target object detection device.

Advantageous Effects of Invention

As described above, a detective information registration device of the present invention for registering detective characteristic information that is information for detecting target objects included in a moving image captured and that is also information characterizing the target objects, the detective information registration device includes: a storage section for storing information; image obtaining means for obtaining a frame image in the moving image; tracking-purpose characteristic extracting means for extracting tracking-purpose characteristic information from the frame image and storing the tracking-purpose characteristic information into the storage section, the tracking-purpose characteristic information being information for tracking a target object included in the moving image captured and also being information characterizing the target object; target object area detecting means for detecting an image area of the target object, based on a change between the tracking-purpose characteristic information extracted by the tracking-purpose characteristic extracting means and the tracking-purpose characteristic information relevant to the frame image stored in the past into the storage section; detective characteristic extracting means for extracting the detective characteristic information from the image area of the target object, the image area being detected by the target object area detecting means; and detective characteristic registration means for registering, into the storage section, a part or all of the detective characteristic information extracted by the detective characteristic extracting means.

Further, a method of the present invention for controlling a detective information registration device for registering detective characteristic information that is information for detecting a target object included in a moving image captured and that is also information characterizing the target object, the method includes the steps of: (a) obtaining a frame image in the moving image; (b) extracting tracking-purpose characteristic information from the frame image and storing the tracking-purpose characteristic information into a storage section, the tracking-purpose characteristic information being information for tracking the target object included in the moving image captured and also being information characterizing the target object; (c) detecting an image area of the target object, based on a change between the tracking-purpose characteristic information extracted in the step (b) and the tracking-purpose characteristic information relevant to the frame image stored in the past into the storage section; (d) extracting the detective characteristic information from the image area of the target object, the image area being detected in the step (c); and (e) registering, into the storage section, a part or all of the detective characteristic information extracted in the step (d).

This makes it possible to easily register a characteristic of the target object because the detective characteristic information for detecting the target object can be registered only by capturing a moving image of the target object.

A target object detection device of the present invention for detecting a target object included in a moving image captured, the detective information registration device includes: a storage section for storing (i) a plurality of pieces of detective characteristic information that is information for detecting the target object and also information characterizing the target object and (ii) one piece or a plurality of pieces of detective common characteristic information that is common to all or a part of the plurality of pieces of detective characteristic information; image obtaining means for obtaining a frame image in the moving image; detective characteristic extracting means for extracting detective characteristic information from the frame image obtained by the image obtaining means; candidate area searching means for searching an area having detective characteristic information similar to the detective common characteristic information as an area where it is possible that the target object is present in the frame image, the candidate area searching means searching the area by use of the detective characteristic information extracted by the detective characteristic extracting means and the detective common characteristic information in the storage section; similarity level calculating means for calculating a similarity level of the detective characteristic information of the candidate area searched by the candidate area searching means and the detective characteristic information in the storage section; and determination means for determining whether the candidate area is an area where the target object is present in the frame image, based on the similarity level calculated by the similarity level calculating means.

Further, a method of the present invention for controlling a target object detection device for detecting a target object included in a moving image captured, the method includes the steps of: (a) obtaining a frame image in the moving image; (b) extracting detective characteristic information from the from image obtained in the step (a); (c) searching an area having detective characteristic information similar to one piece or a plurality of pieces of detective common characteristic information as an area where it is possible that the target object is present in the frame image, the step of searching being carried out by use of the detective characteristic information extracted in the step (b) and one piece or a plurality of pieces of detective common characteristic information that is common to a part or all of a plurality of pieces of detective characteristic information, the plurality of pieces of detective characteristic information being information stored in a storage section and characterizing the target object; (d) calculating a similarity level between the detective characteristic information included in the candidate area searched in the step (c) and the detective characteristic information stored in the storage section; and (e) determining whether the candidate area is an area where the target object is present in the frame image, based on the similarity level calculated in the step (d).

According to the above configuration and method, by using one piece or a plurality of pieces of detective common characteristic information that is common to a part or all of a plurality of pieces of detective characteristic information that is information stored in the storage section and that also characterizes a target object, a candidate area is searched. The candidate area is in a frame image obtained from a moving image captured and has detective characteristic information similar to the detective common characteristic information.

As a result, an area having detective characteristic information similar to the detective characteristic information stored in the storage section can be determined to be the area where the target object is present.

For example, a case where detective characteristic information of a domesticated dog of a user is registered is assumed. In such a case, when an image is captured by the target object detection device, an area where the domesticated dog is present can be detected if the domesticated dog is present within an image capture range.

For a fuller understanding of the nature and advantages of the invention, reference should be made to the ensuing detailed description taken in conjunction with the accompanying drawings.

DESCRIPTION OF EMBODIMENTS

The following explains further in detail the present invention by using examples and comparative examples. However, the present invention is by no means limited by these examples and comparative examples. The following describes one embodiment of the present invention, with reference to FIGS. 1 to 12.

Figure 2:
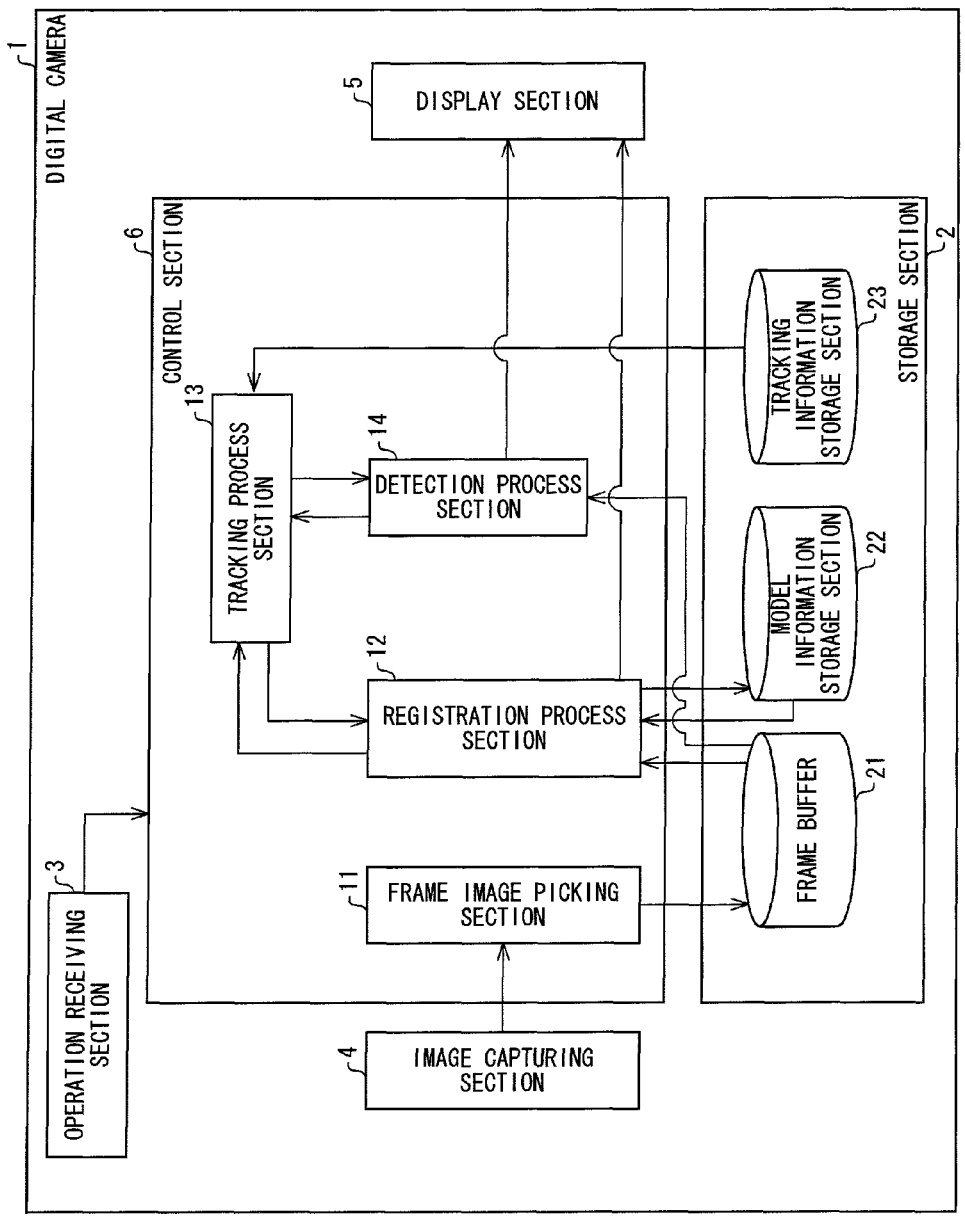
FIG. 2 is a block diagram showing a configuration of a digital camera according to the above embodiment.

FIG. 2 is a block diagram showing a configuration of a digital camera 1 according to the present embodiment. As shown in FIG. 2, the digital camera 1 is configured to include a storage section 2, an operation receiving section 3, an image capturing section 4, a display section 5, and a control section 6.

The digital camera 1 is a camera for easy registration of an object (target object) to be detected and for detection of a desired object from an image being captured by use of information (detective characteristic information) of an object registered for detection, and further for notification of a detection result.

Now, it is assumed that for example, detective characteristic information of a pet that a user has is registered in the digital camera 1 in advance and an image including the pet is captured. In such a case, it is possible to detect an area in which the pet is present in a captured image.

Further, if there is a function to automatically adjust a focus or exposure to a detected area, a focus or exposure can be automatically adjusted to the pet.

Next, each section of the digital camera 1 is explained below.

The storage section 2 stores images captured by the digital camera 1, data used for a detection process, data used for a tracking process, and the like. The storage section 2 is configured to include a frame buffer 21, a model information storage section (feature storage section) 22, and a tracking information storage section 23. The frame buffer 21, the model information storage section 22, and the tracking information storage section 23 are explained later in detail. A concrete example of the storage section 2 is a flash memory. Alternatively, if only capability of temporary storage is required (frame buffer 21 or the like), a RAM (Random Access Memory) can be used; if only capability to read out a program or the like is required, a ROM (Read Only Memory) can be used.

The operation receiving section 3 receives an operation with respect to the digital camera 1. For example, the operation receiving section 3 receives an ID (identification, identification information) indicative of a registration target object, and/or an operation that indicates a position of a target object on the display section 5. This operation concerning the position of the target object may be performed by having a touchscreen and specifying the position of the target object on the touchscreen. Alternatively, the operation may be performed by displaying a cursor on a screen and specifying the position by use of the cursor. Note that specific examples of the operation receiving section 3 are various buttons, a touch screen, and the like.

The image capturing section 4 generates video data by capturing an image of an object whose image is to be taken, for example, a target object. More specifically, the image capturing section 4 may have a configuration including an image capturing element such as a CCD (Charge Coupled Device) or CMOS (Complementary Metal-oxide Semiconductor) image sensor for converting light from the object to an electric signal, and a video processing circuit for converting the electric signal form the image capturing element into RGB digital video data. Then, the image capturing section 4 transmits the generated video data to the control section 6. Note that the image capturing section 4 has an AF (auto focus) function.

The display section 5 displays an image being captured by the image capturing section 4, a state of the digital camera 1, a detection result, and/or the like. The display section 5 may be realized by any device as long as the device is capable of displaying information. Specific examples of the display section 5 are a liquid crystal display, an organic EL (Electro Luminescence) display, and a plasma display.

The control section 6 is configured to include a frame image clipping section 11, a registration process section 12, a tracking process section (tracking means) 13, and a detection process section 14. The control section 6 is for carrying out registration, tracking, and detection of an object to be detected. The registration process section 12, the tracking process section 13, and the detection process section 14 are described later in details.

The frame image clipping section 11 clips out a frame image from the video data transmitted from the image capturing section 4, and stores the clipped frame image into the frame buffer 21.

The frame buffer 21 stores a frame image clipped out by the frame image clipping section 11.

Figure 1:
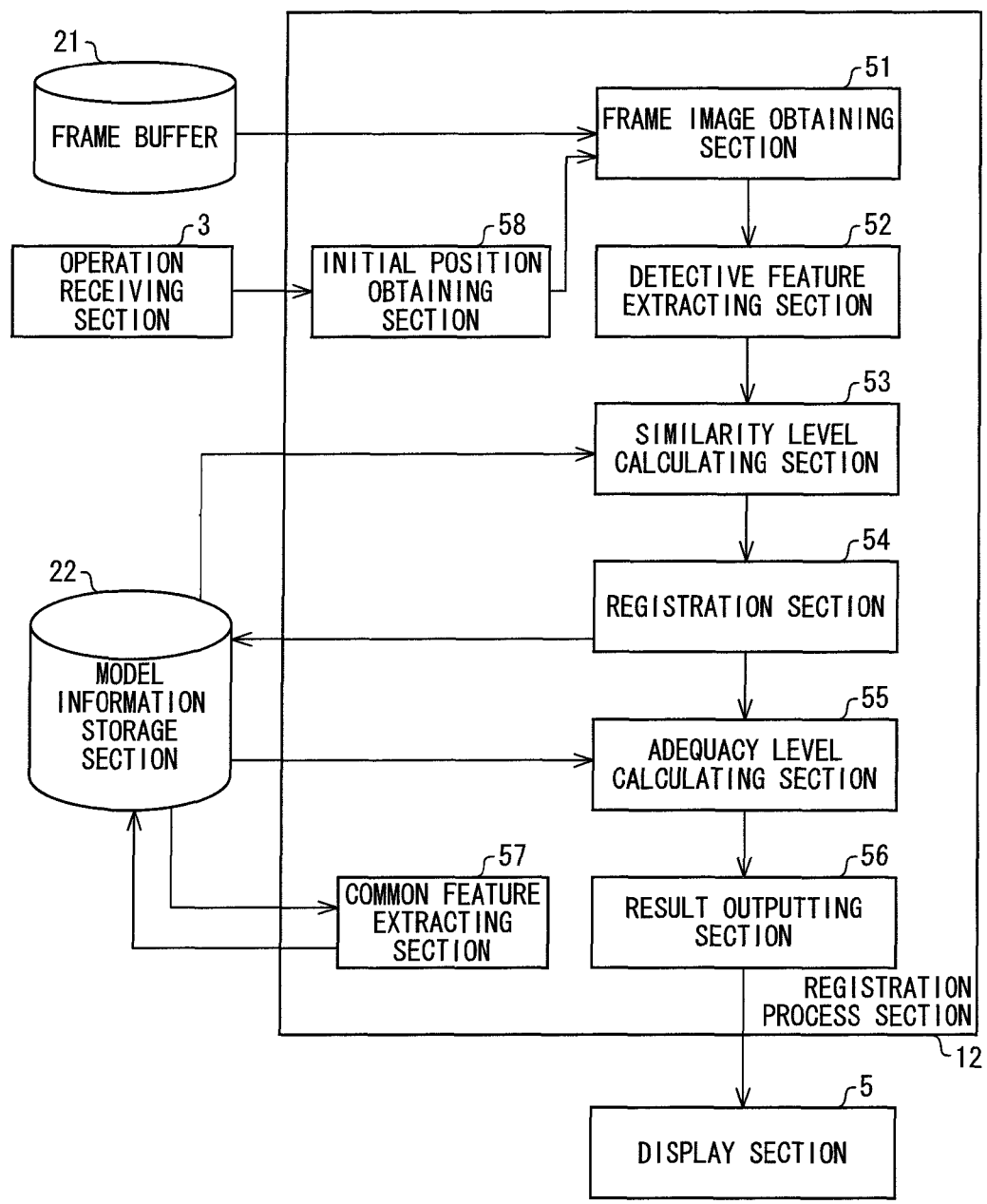
FIG. 1 illustrates an embodiment of the present invention and is a block diagram showing a configuration of a registration process section of a digital camera.

Next, the following explains the registration process section 12 with reference to FIG. 1. FIG. 1 is a block diagram illustrating a configuration of the registration process section of the digital camera 1 according to the present embodiment.

As shown in FIG. 1, the registration process section 12 is configured to include a frame image obtaining section (image obtaining means) 51, a detective feature extracting section (target object area detecting means, detective characteristic extracting means) 52, a similarity level calculating section (similarity level calculating section) 53, a registration section (detective characteristic registration means) 54, an adequacy level calculating section (in-motion change amount calculating means, adequacy level calculating means) 55, a result outputting section 56, a common feature extracting section (common characteristic specifying means) 57, and an initial position obtaining section (initial position obtaining means) 58.

Figure 3:
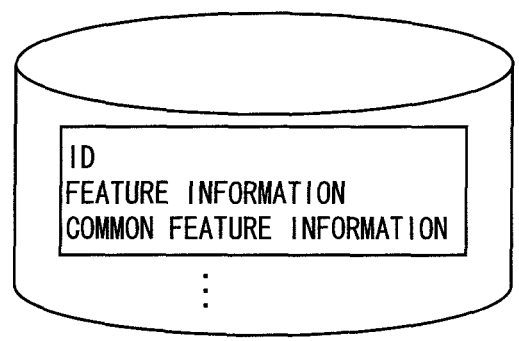
FIG. 3 is an explanatory diagram illustrating the contents stored in a model information storage section of a digital camera according to the above embodiment.

The registration process section 12 extracts a feature (detective characteristic information) of a target object in the obtained frame image and stores the feature in the model information storage section 22. Then, in the model information storage section 22, the followings are stored as shown in FIG. 3. FIG. 3 is an explanatory diagram illustrating contents stored in the model information storage section 22. The model information storage section 22 stores an ID indicative of a target object, feature information indicating a feature of the target object for each frame, common feature information indicative of a common feature that is a feature common to a feature of each frame.

If there are a plurality of IDs, the information corresponding to the plurality of IDs is stored.

The frame image obtaining section 51 obtains a frame image from the frame buffer 21 and transmits the obtained frame image to the detective feature extracting section 52.

The detective feature extracting section 52 extracts a feature of a target image from the frame image obtained from the frame image obtaining section 51, and then transmits the obtained feature to the similarity level calculating section 53. The extraction of the feature of the target object is carried out as follows. That is, a target object area is detected based on a position of the target object specified by a user with use of the operation receiving section 3 and a change in characterizing point information obtained by the tracking process section 13 in the frame image.

Note that by separating a background region and a target object region based on a change on an image in a plurality of frame images, a target object area may be detected.

Then, the feature of the object is extracted by extracting the feature of a detected target object area. The feature indicates characteristics of a target object, for example, color information, edge information, and/or the like each obtained from an image.

An area once detected as the target object area is tracked by the tracking process section thereafter. Thereby, the target object area can be detected all the time and the feature can be extracted. Note that the tracking process is explained in detail later.

The similarity level calculating section 53 calculates a similarity level between the obtained feature of the target object and a feature stored in the model information storage section 22 for the same target object that is identical to the target object whose feature is obtained. Such calculation is carried out if the feature indicative of the same target object is stored which same target object is identical to the target object to be stored in the model information storage section 22. Then, the similarity level calculating section 53 transmits a calculation result to the registration section 54.

If the similarity level obtained from the similarity level calculating section 53 is within a predetermined value range, the registration section 54 assumes that the feature extracted by the detective feature extracting section 52 is indicative of the target object and stores the feature in the model information storage section 22. Then, the registration section 54 transmits, to the adequacy level calculating section 55, information indicating that registration is completed.

Here, for the following reason, the feature is stored only in a case where the similarity level is within the predetermined range. That is, if the similarity level is too large, in other words, if a feature having been already registered is too similar to the feature to be registered, the registration is meaningless. On the contrary, if the similarity level is too small, in other words, if a feature having been already registered is too different from the feature to be registered, it is inappropriate to take that the feature having been already registered and the feature to be registered indicate the same target object.

The adequacy level calculating section 55 calculates an adequacy level, when the adequacy level calculating section 55 obtains information indicating that the registration section has completed the registration. The adequacy level indicates an extent to which the feature stored in the model information storage section 22 can specify a target object. If the adequacy level calculated indicates a feature capable of specifying a target object, the adequacy level calculating section 55 transmits, to the result outputting section 56, information for notifying that it is possible to complete registration. Otherwise, that is, if the adequacy level calculated indicates a feature incapable of specifying a target object, the adequacy level registration section 55 transmits, to the result outputting section 56, information for notifying that additional registration data is still required.

Note that the adequacy level is calculated by estimating (i) an orientation of a target object based on an amount of change in rotation angle obtained by calculation of a movement amount and (ii) a pose based on a difference in feature in a case where the target object rotates at one position.

Here, the following explains a similarity level, a shift in orientation, and an adequacy level.

On assumption that: the number of pieces of registered data is m; the number of dimensions of feature is n; a feature of i-th registered data is $F_i$; and the k-th characteristic included in the feature of the registered data is $F_i[k]$, a difference between two pieces of registered data (the larger the value is, the greater the difference becomes) is calculated by the following calculation expression:

$$D_{i,j}=\Sigma_{k=1}^{n}|F_i[k]-F_j[k]|$$ [Expression 1]

Further, the similarity level $S_{i,j}$ is calculated as below:

$$S_{i,j}=D_{max}-D_{i,j}$$

($D_{max}$ is the maximum value of the difference)

Further, a shift in orientation is calculated as follows.

Each registered data maintains an estimated orientation (rotation angle) with respect to an initial registration frame (first registered data). Note that for this rotation angle, "roll/pitch/yaw angles" or the like can be used. The "roll/pitch/yaw angles" expresses the rotation angle by rotations α (roll), β (pitch), and γ (yaw) respectively having, as center axes, an x-axis, a y-axis, and a z-axis in three dimensions.

In a case where the "roll/pitch/yaw angles" are used, an i-th rotational matrix is obtained as follows on assumption that a rotation angle of the i-th registered data is $r_i$ ($\alpha_i$, $\beta_i$, $\gamma_i$) and a rotational matrix is R[i].

$$R[i]=R_z(\gamma_i) \cdot R_x(\alpha_i) \cdot R_y(\beta_i)$$

$$R_x(\alpha) = \begin{pmatrix} 1 & 0 & 0 \\ 0 & \cos\alpha & \sin\alpha \\ 0 & -\sin\alpha & \cos\alpha \end{pmatrix},$$ [Expression 2]

$$R_y(\beta) = \begin{pmatrix} \cos\beta & 0 & -\sin\beta \\ 0 & 1 & 0 \\ \sin\beta & 0 & \cos\beta \end{pmatrix},$$

$$R_z(\gamma) = \begin{pmatrix} \cos\gamma & \sin\gamma & 0 \\ -\sin\gamma & \cos\gamma & 0 \\ 0 & 0 & 1 \end{pmatrix}$$

Then, a rotational matrix from the i-th registered data to the j-th registered data is expressed by the following formula:

$$R[i{\rightarrow}j]=R[j] \cdot R[i]^{-1}$$

In this case, a size of the rotational angle (a shift in orientation between the i-th registered data and the j-th registered data) is as follows.

$$\|R[i{\rightarrow}j]\|$$ [Expression 3]

Further, examples of a method for obtaining the adequacy level are as follows. Note that the adequacy level indicates variations of registered data.

The first method is to obtain an adequacy level based on a scale of a shift in orientation. In this case, the adequacy level is expressed by a total scale of shifts in orientation of all combinations of registered data. According to the first method, the adequacy level is obtained by the following expression.

$$C_r=\Sigma_{i=1}^{m-1}\Sigma_{j=i}^{j=m}\|R[i{\rightarrow}j]\|$$ [Expression 4]

The second method is to obtain the adequacy level based on differences in feature. In this case, the adequacy level is calculated as a total difference in feature of all combinations of registered data. The adequacy level is obtained by the following expression.

$$C_f=\Sigma_{i=1}^{m-1}\Sigma_{j=i}^{j=m}D_{i,j}$$ [Expression 5]

The third method is to obtain the adequacy level by use of both the scale of shifts in orientation and differences in feature. In this case, the adequacy level is calculated by using the scale of shifts in orientation in a case where the shift in orientation is large in combination of two pieces of registered data. Alternatively, the adequacy level is calculated by using differences in feature in a case where the shift in orientation is small in a case where the shift in orientation is large in combination of two pieces of registered data. The adequacy level is obtained by the following formula.

$$C_b=\Sigma_{i=1}^{m-1}\Sigma_{j=i}^{j=m}\text{Max}(\|R_{i{\rightarrow}j}\|,D_{i,j})$$ [Expression 6]

The result outputting section 56 notifies the contents of information obtained by the adequacy level calculating section 55.

The common feature extracting section extracts a feature (detective common feature information) that is common to a feature of each frame which is stored in the model information storage section 22. Then, the common feature extracting section stores the extracted feature as a common feature indicating a target object, into the model information storage section 22.

The initial position obtaining section 58 obtains data indicative of a position received by the operation receiving section 3, and transmits the data to the frame image obtaining section 51.

Figure 4:
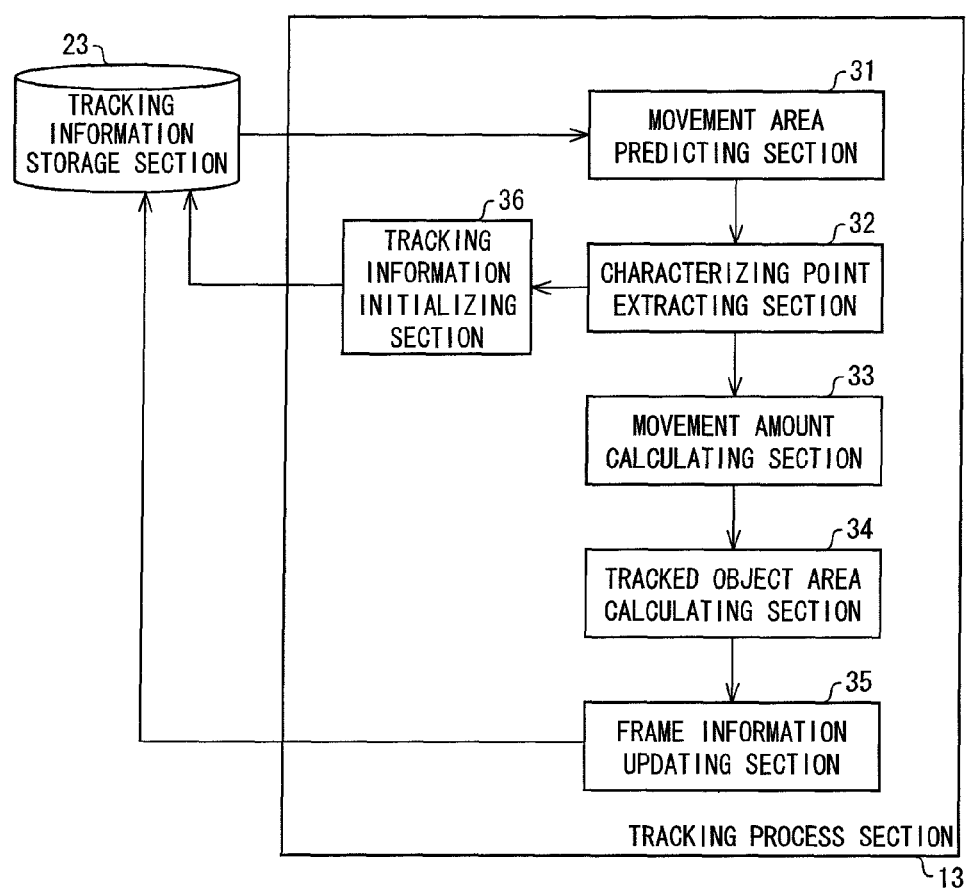
FIG. 4 is a block diagram illustrating a configuration of a tracking process section of a digital camera according to the above embodiment.

Now, the following explains the tracking process section with reference to FIG. 4. FIG. 4 is a block diagram illustrating a configuration of a tracking process section 13 of the digital camera 1 according to the present embodiment.

Figure 5:
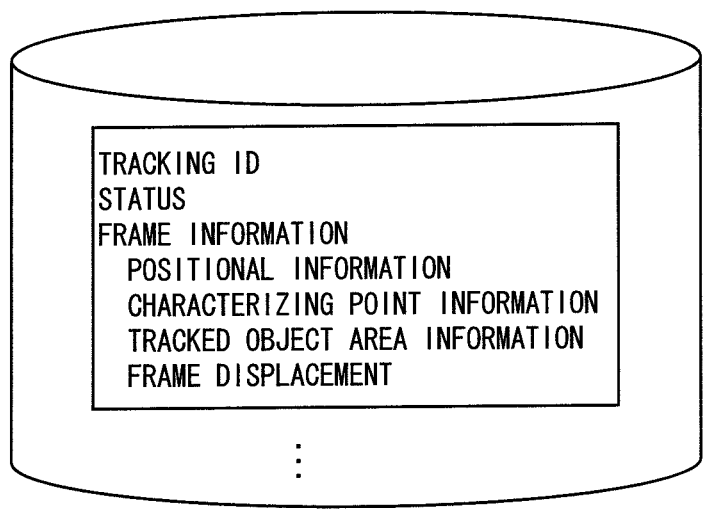
FIG. 5 is an explanatory diagram illustrating tracking information stored in a tracking information storage section of a digital camera according to the above embodiment.

As shown in FIG. 4, the tracking process section 13 is configured to include a movement area predicting section 31, a characterizing point extracting section (tracking-purpose characteristic extracting means) 32, a movement amount calculating section 33, a tracking target area calculating section 34, a frame information updating section 35, and a tracking information initializing section 36. Then, the tracking process section 13 uses tracking information stored in the tracking information storage section 23, for performing a tracking process. FIG. 5 is an explanatory diagram illustrating the tracking information stored in the tracking information storage section 23.

As shown in FIG. 5, the tracking information storage section 23 stores a tracking ID indicative of an object to be tracked, a status indicating whether or not the object to be tracked has been detected and whether or not tracking of the object to be tracked is being carried out, and frame information. Further, these pieces of information are stored for each ID. That is, if there are a plurality of IDs, the information described above is stored for each of all the IDs.

The frame information includes positional information indicating center position coordinates of an object to be tracked, characterizing point information (tracking-purpose characteristic information), tracked object area information that is area information of the object to be tracked on an image, and a frame movement amount indicating a movement amount from the initial frame and a previous frame. Further, in a case where the status is in tracking, information for frames being tracked is stored. Note that it is also possible to store frame information of some past frames.

The movement area predicting section 31 predicts an area where an object to be tracked is present in the current frame, based on the frame movement amount stored in the tracking information storage section 23.

The characterizing point extracting section 32 extracts a characterizing point of an object to be tracked. The characterizing point is a color in a partial point showing a characteristic of the object to be tracked, edge information, or the like. Note that the characterizing point is not limited to a point but may be an area.

The movement amount calculating section 33 calculates a relative movement amount of an object to be tracked, from a transition of the characterizing point extracted by the characterizing point extracting section 32. The movement amount of the object to be tracked can be expressed by a change in relative position (x, y, z), a rotation ($\alpha$, $\beta$, $\gamma$) of the object to be tracked, or the like.

The tracking area calculating section 34 separates the tracking target area and a background area based on the transition of the characterizing point extracted by the characterizing point extracting section 32, and specifies an area to be tracked.

The frame information updating section 35 updates information stored in the tracking information storage section 23. Such information includes a position of a characterizing point in the current frame, characterizing point information, tracked object area information, a frame movement amount, and the like.

The tracking information initializing section 36 sets the information stored in the tracking information storage section 23 to an initial value. This initial value indicates positional information, characterizing point information, tracked object area information of a frame at the start of tracking.

Figure 6:
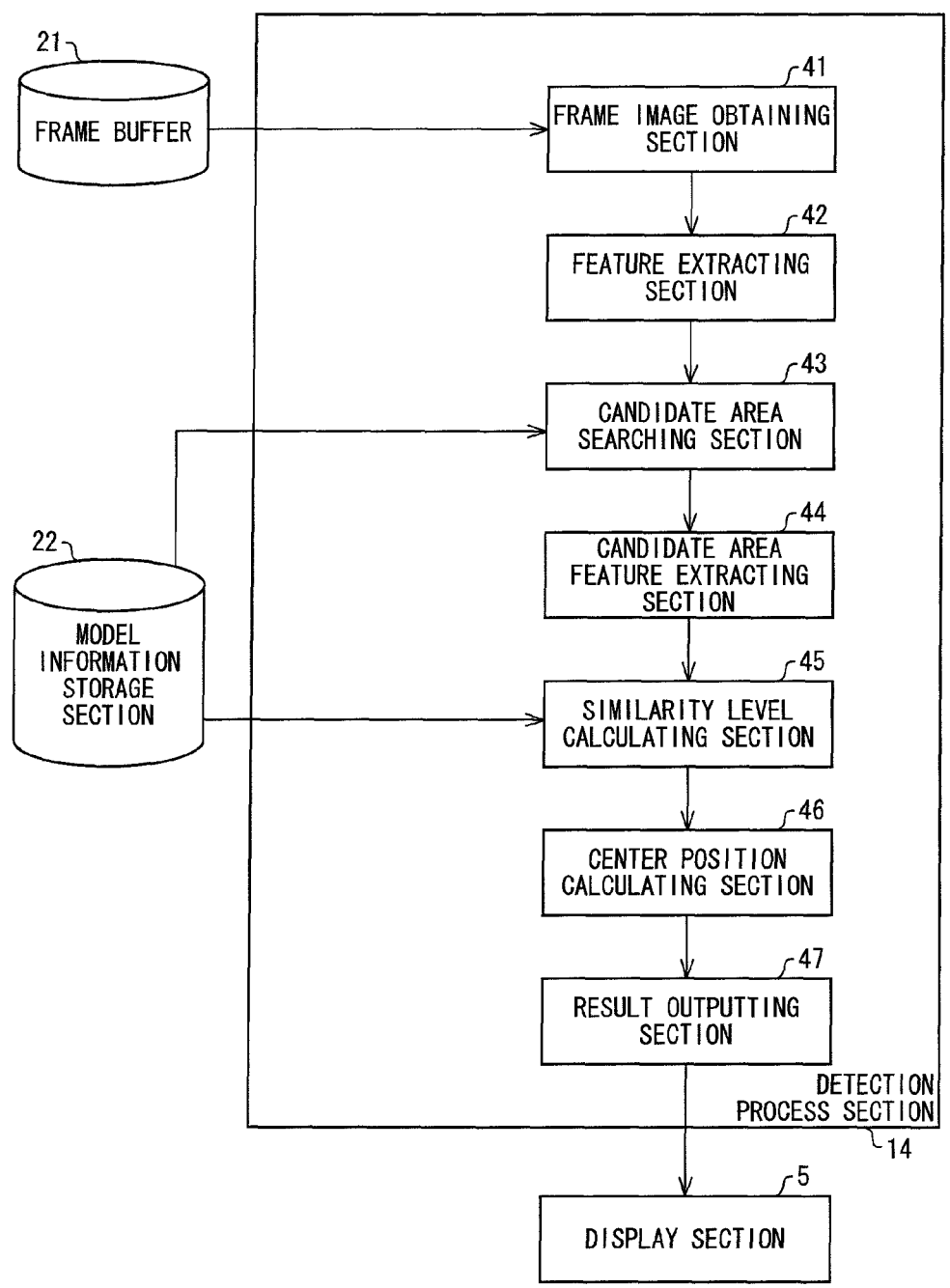
FIG. 6 is a block diagram showing a configuration of a detection process section of a digital camera according to the above embodiment.

The following explains the detection process section 14 with reference to FIG. 6. FIG. 6 is a block diagram illustrating a configuration of the detection process section 14 of the digital camera 1 of the present embodiment. As shown in FIG. 6, the detection process section 14 is configured to include a frame image obtaining section (image obtaining means) 41, a feature extracting section (detective feature extracting means) 42, a candidate area searching section (candidate area searching means) 43, a candidate area feature extracting section 44, a similarity level calculating section (similarity level calculating means) 45, a center position calculating section (determination means) 46, and a result outputting section (notification means) 47.

Then, the detection process section 14 searches a position in a frame image in which position a target object stored in the model information storage section 22 is present, and output a result of the search.

The frame image obtaining section 41 obtains a frame image from the frame buffer 21. Then, the frame image obtaining section 41 transmits the obtained frame image to the feature extracting section 42.

The feature extracting section 42 extracts a feature of the frame image obtained from the frame image obtaining section 41.

The candidate area searching section 43 scans the frame image obtained by the frame image obtaining section 41, and searches, by use of the common feature stored in the model information storage section 22, an area (candidate area) where it is highly possible that a target object is present. Then, the candidate area searching section 43 transmits the candidate area as a result of the search to the candidate area feature extracting section 44. Note that there may be a case where a plurality of areas are searched in one frame image.

The candidate area feature extracting section 44 extracts a feature of the candidate area obtained from the candidate area searching section 43. Then, the candidate area feature extracting section 44 transmits the extracted feature to the similarity level calculating section 45.

The similarity level calculating section 45 compares the feature obtained from the candidate area feature extracting section 44 and the feature stored in the model information storage section 22, so as to calculate a similarity level.

The center position calculating section 46 assumes that the candidate area searched by the candidate area searching section 43 is an area where a target object is present in a case where the similarity level calculated by the similarity level calculating section 45 exceeds a threshold. Then, the center position calculating section 46 calculates a center position of the area, and transmits information indicating the center position to the result outputting section 47.

The result outputting section 47 causes the display section 5 to display the center position obtained from the center position calculating section 46.

Figure 7:
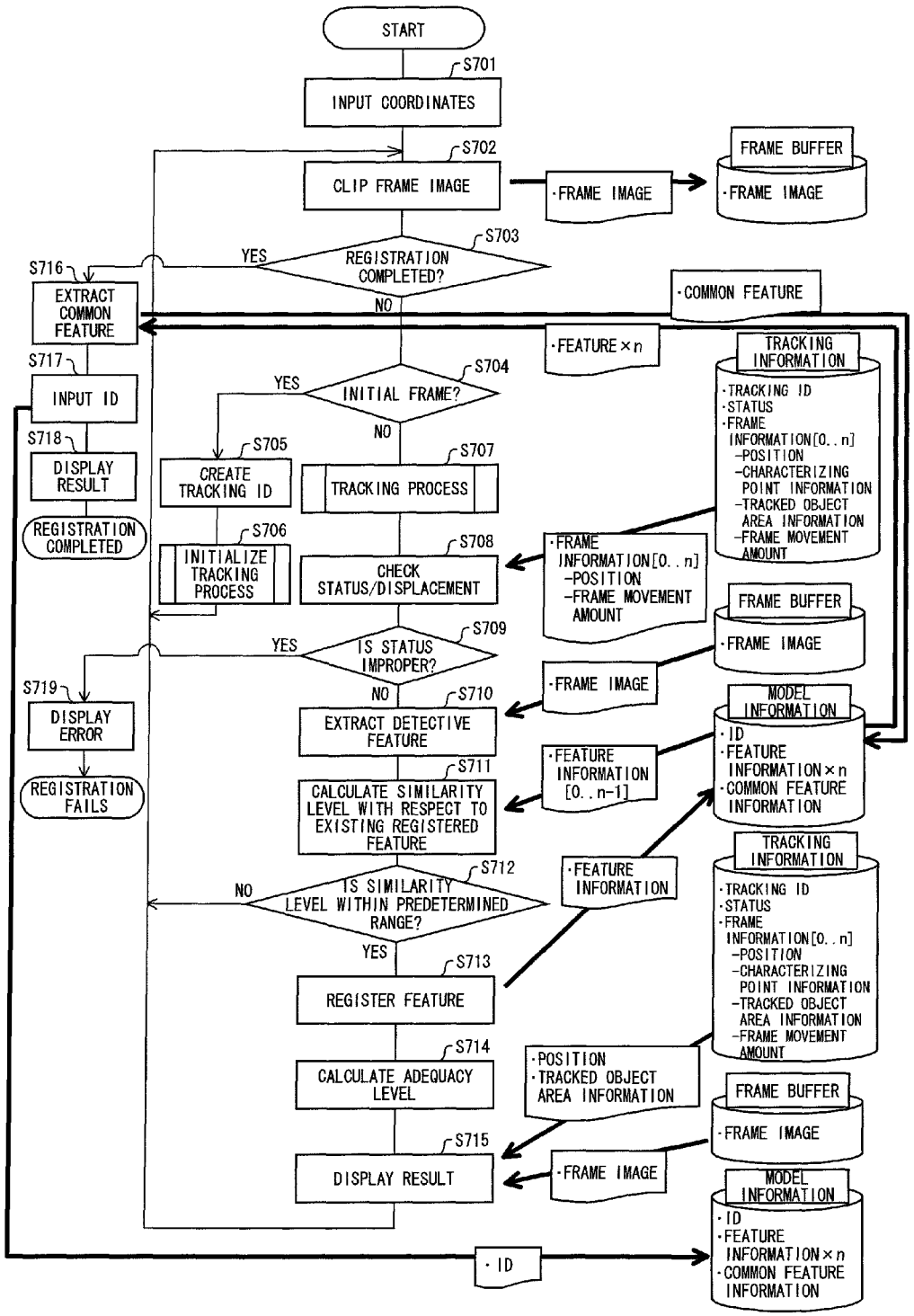
FIG. 7 is a flowchart showing a flow of a registration process of a target object in a digital camera according to the above embodiment.

Next, the following explains flows of respective processes of registration, tracking, and detection of a target object in the digital camera 1, with reference to FIGS. 7 to 10. FIG. 7 is a flow chart illustrating a flow of a registration process of a target object of the digital camera 1.

As shown in FIG. 7, when a position of a target object is received from a user via the operation receiving section 3 (S701), the frame image extracting section 11 clips out a frame image from a moving image being taken (S702). Then, the registration process section 12 determines whether or not to end registration (S703). In a case where it is determined that the registration is not completed (NO in S703), the tracking process section 13 determines whether or not the frame image clipped out by the frame image clipping section 11 is of an initial frame (S704).

If the frame image is of the initial frame (YES in S704), the tracking process section 13 creates a tracking ID and initializes a tracking process (S706). The initialization of the tracking process is explained later. Then, the process returns to S702. On the other hand, if the frame image is not of the initial frame (NO in S704), the tracking process section 13 starts the tracking process (S707). The tracking process is explained later.

Then, the detection feature extracting section 52 checks the status and the frame information stored in the tracking information storage section 23 (S708), and determines whether or not the status is improper (S709). Then, if it is determined that the status is improper (NO in S709), the display section 5 performs error display (S719) and the registration process is ended. On the other hand, if it is determined that the status is not improper (YES in S709), the detection feature extracting section 52 extracts a feature of a target object (S710).

Here, the expression that the status is improper indicates a case where the tracking process has not normally completed. Further, the status indicates a tracking state. There are three tracking states: "unrecognized"; "recognized"; and "in tracking". The "unrecognized" state indicates an initialized state; the "recognized" state indicates a state in which tracking is not initialized. The "in tracking" state indicates a state in tracking.

Further, the status shifts from the "unrecognized" state to the "recognized" state, when the process proceeds from S705 to S706 or from S1013 to S1014 which are described later. The status shifts from the "recognized" state to the "in tracking" state in S802 described later. Further, the status shifts from the "in tracking" state to the "unrecognized" state prior to S716 or S907 described later.

Then, the similarity level calculating section 53 compares the feature of the target object extracted by the detective feature extracting section 52 and the feature of a registered target object that is identical to the target object, so as to calculate a similarity level (S711). Then, if the similarity level is not within a predetermined range (NO in S712), the process returns to S702 without registration. On the other hand, the similarity level is within the predetermined range (YES in S712), the registration section 54 stores the feature of the target object into the model information storage section 22 (S713).

Then, the adequacy level calculating section 55 calculates an adequacy level of the feature stored in the model information storage section 22 (S714). Then, the display section 5 displays a result of the calculation (S715). Subsequently, the process returns to S702.

On the other hand, in a case where the registration is to be ended because the adequacy level exceeds a threshold or the like (YES in S703), the common feature extracting section 57 calculates a common feature of a feature of each frame which feature is stored in the model information storage section 22 (S716). Then, an ID of the target object is received (S717). Then, the display section 5 displays a registration result (S718). Thereby, the registration process is completed.

Figure 8:
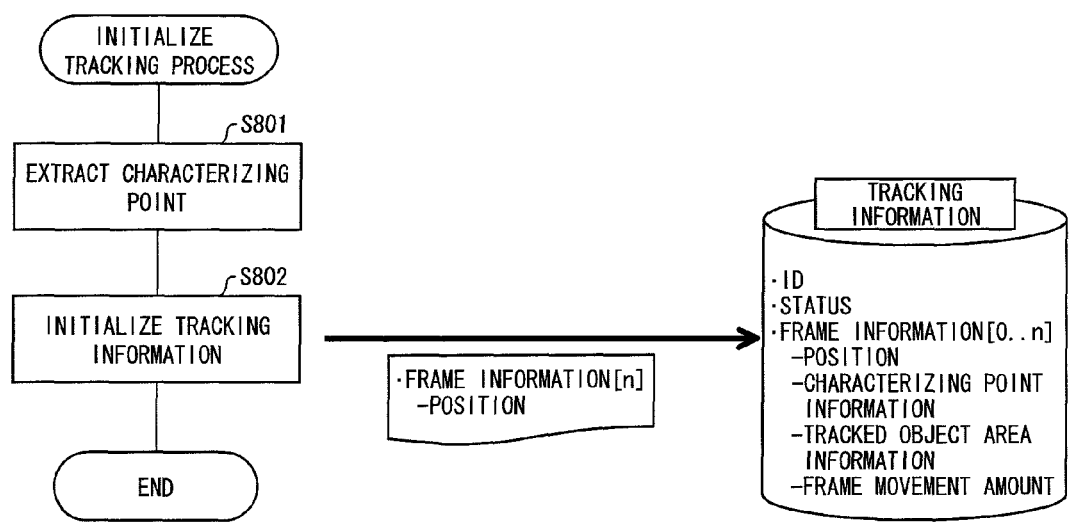
FIG. 8 is a flowchart showing a flow of initialization of a tracking process in a digital camera according the above embodiment.

The above is a flow of the registration process. Next, the following explains a flow of initialization of the tracking process with reference to FIG. 8. FIG. 8 is a flowchart illustrating a flow of initialization of the tracking process in the digital camera 1.

As shown in FIG. 8, in a case where the tracking process is initialized, the characterizing point extracting section 32 extracts a characterizing point of an object to be tracked (S801). Then, the tracking information initializing section 36 stores only positional information of the characterizing point extracted by the characterizing point extracting section 32 into the tracking information storage section 23, while resetting other information (S802). At this stage, the flow of the initialization of the tracking process is completed.

Figure 9:
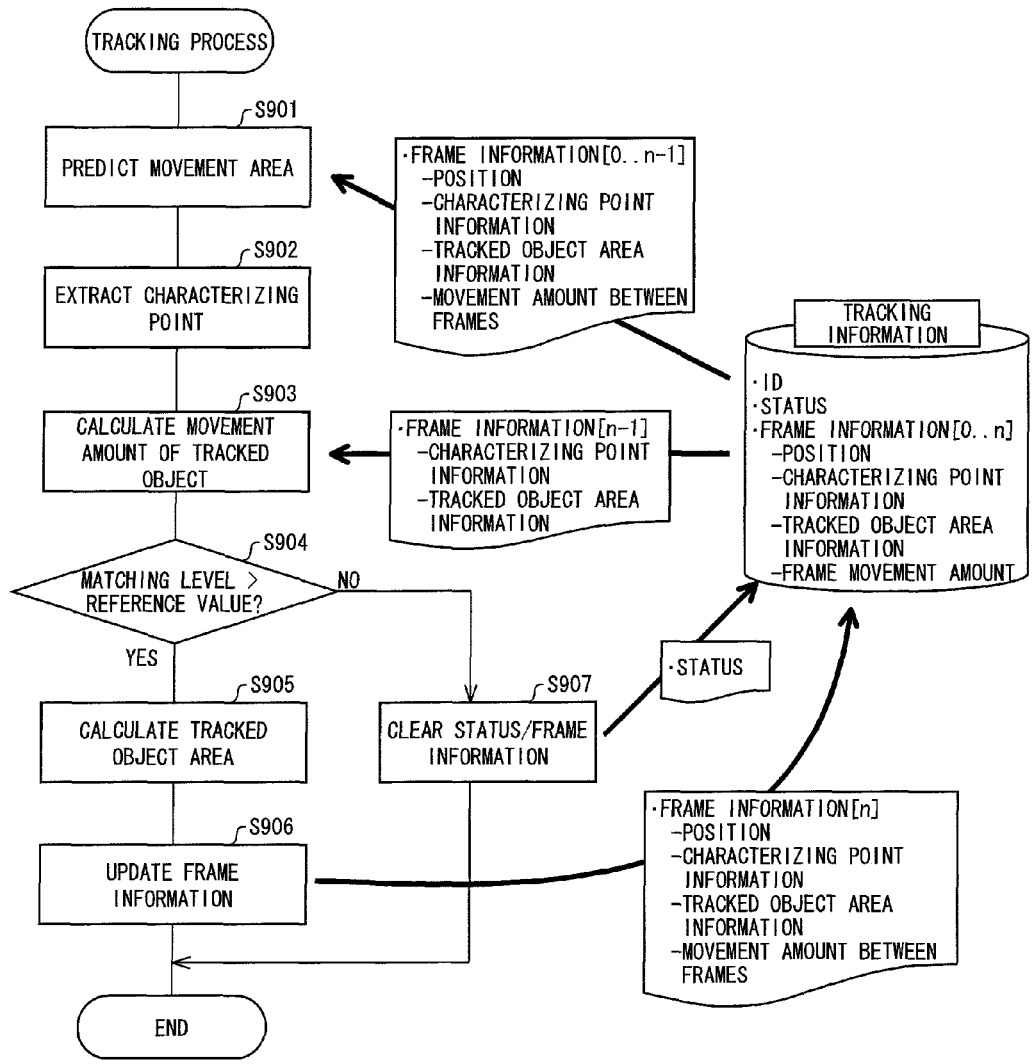
FIG. 9 is a flowchart showing a flow of a tracking process in a digital camera according to the above embodiment.

Next, the following explains the tracking process with reference to FIG. 9. FIG. 9 is a flowchart illustrating a flow of the tracking process in the digital camera 1 with reference to FIG. 9.

As shown in FIG. 9, in a case where the tracking process is carried out, the tracking process section 13 predicts a position in the current frame based on a movement amount of the tracked object in past frames (S901). Then, the characterizing point extracting section 32 extracts a characterizing point (S902). Further, the movement amount calculating section 33 calculates a movement amount of an object to be tracked, based on a change in position of characterizing points of a past frame and the current frame (S903). Then, the tracking target area calculating section 34 calculates a matching level by comparing images of a preceding frame and the current frame, and determines whether or not the matching level calculated is greater than a reference value (S904). Then, if the matching level is equal to or less than the reference value (NO in S904), the frame information updating section 35 clears the tracking information stored in the tracking information storage section 23. This is because it is considered that tracking cannot be carried out in a case where the preceding frame and the current frame are have a too large difference.

On the other hand, in a case where the matching level is greater than the reference value (YES in S904), the tracking target area calculating section 34 calculates a boundary between the object to be tracked and a background from the movement amount calculated by the movement amount calculating section 33, so as to calculate a tracked object area (S905). Then, the frame information updating section 35 updates the frame information (S906).

Figure 10:
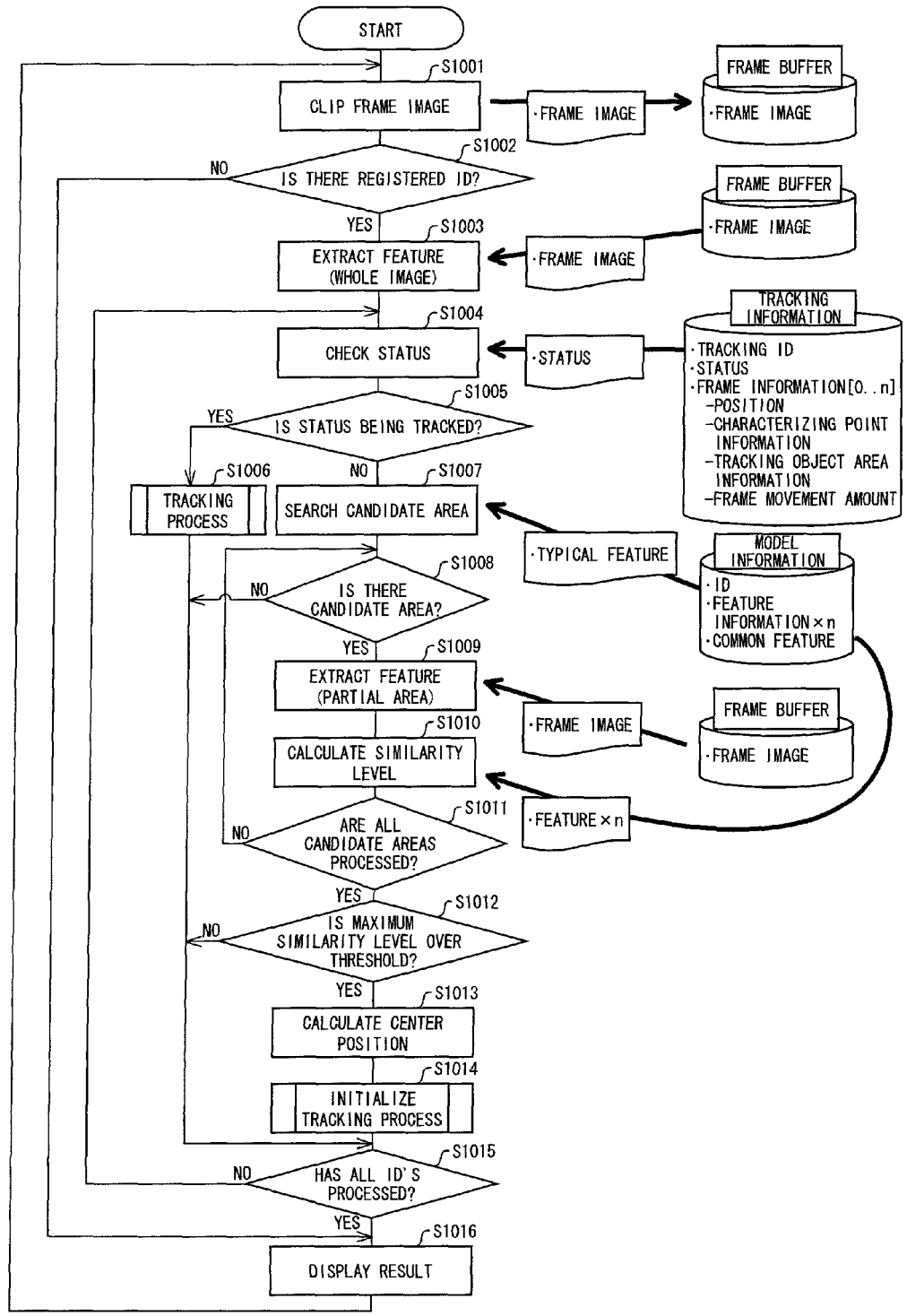
FIG. 10 is a flowchart showing a flow of a process for detecting a target object in a digital camera 1 according to the above embodiment.

Next, the following explains a flow of the detection process with reference to FIG. 10. FIG. 10 is a flowchart illustrating a flow of a process for detecting a target object in the digital camera 1.

As shown in FIG. 10, first, the frame image clipping section 11 clips out a frame image from a moving image being taken (S1001). Next, the detection process section 14 determines whether or not an ID indicative of the target object is registered in the model information storage section 22 (S1002). In a case where it is determined that the ID is not registered in the model information storage section 22 (NO in S1002), a result is directly displayed (S1016). On the other hand, in a case where it is determined that the ID is registered in the model information storage section 22 (YES in S1002), the feature extracting section 42 extracts a feature of the frame image (S1003). Then, the tracking process section 13 checks the status of the tracking information (S1004). In a case where the status is the "in tracking" state (YES in S1005), the tracking process is carried out (S1006). On the other hand, in a case where the status is not the "in tracking" state (NO in S1005), the candidate area searching section 43 searches, from the frame image, a candidate area that is an area where the target object is present (S1007).

Then, in a case where the candidate area is present (YES in S1008), the candidate area feature extracting section 44 extracts a feature of the candidate area (S1009). Subsequently, the similarity level calculating section 45 compares the feature extracted and the feature stored in the model information storage section 22, so as to calculate the similarity level (S1010). When the extraction of the feature and the calculation of the similarity levels are completed in regard to all the candidate areas (YES in S1011), the similarity level calculating section 45 determines whether or not the maximum value of the calculated similarity level is equal to or more than a threshold (S1012).

In a case where the maximum value of the similarity level is equal to or more than the threshold (YES in S1012), the center position calculating section 46 calculates a center position of the candidate area (S1013). Then, when the above process is completed for each of all the IDs (YES in S1015), display showing the center position is performed (S1016)

On the other hand, in a case where there is no candidate area (NO in S1008), the process proceeds to the step S1015. Further, in a case where the maximum value of the similarity level does not exceed the threshold (NO in S1012), the process proceeds to S1015. Meanwhile, in a case where the maximum value of the similarity level does not exceed the threshold (No in S1012), the process proceeds to S1015.

At this stage, the detection process is completed.

As described above, in the present embodiment, in a case where a target object is registered, an image of the target object is captured as a moving image. Then, in a frame at which registration is started, a position where the target object is present is received. This makes it possible to separate the target object and the background by observing a change in each frame of the moving image. As a result, an area of the target object can be determined. Therefore, it becomes possible to easily register the target object.

Further, in a case where the target object is detected, by using a common feature of a feature of each frame registered, an area (candidate area) where the target object is considered to be present is searched in a captured image. Then, a feature of the candidate area searched is compared with a feature of each frame so that it is determined whether or not this candidate area is an area where the target object is present. This makes it possible to easily detect the target object.

Further, by carrying out the tracking process, the target object once detected can be automatically tracked. Accordingly, it is possible to track the target object even when the target object is in a pose or an orientation that is not registered. As a result, an area where the target object is present can be detected.

Figure 11:
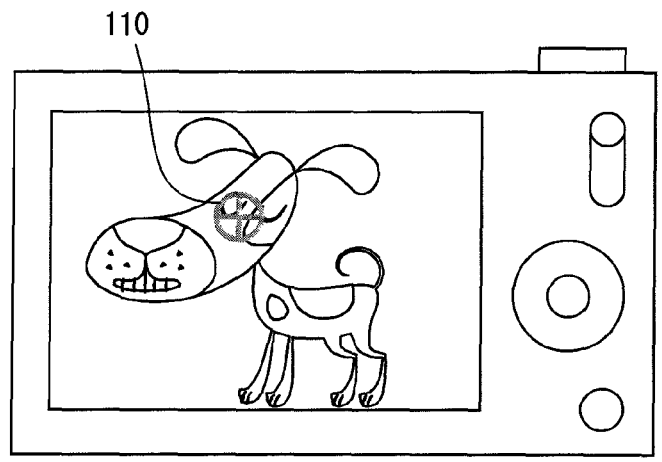
FIG. 11 is an explanatory diagram in a case where a dog is registered in the above embodiment; (a) of FIG. 11 is a diagram illustrating a state in which one point in an area where the dog is present is specified, and (b) of FIG. 11 is a diagram illustrating a state in which an area of the dog to be registered is discriminated.
Figure 11:
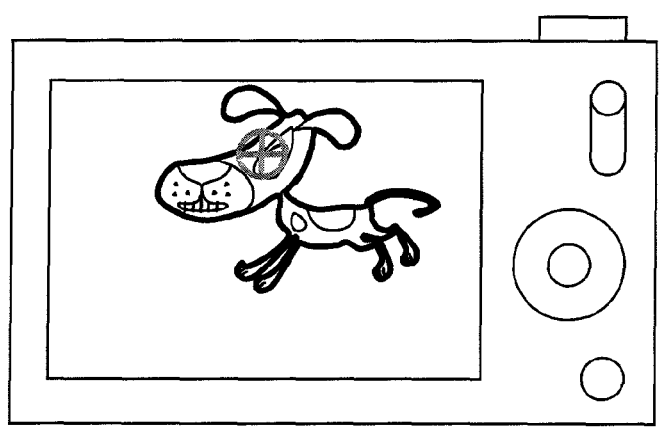
Figure 12:
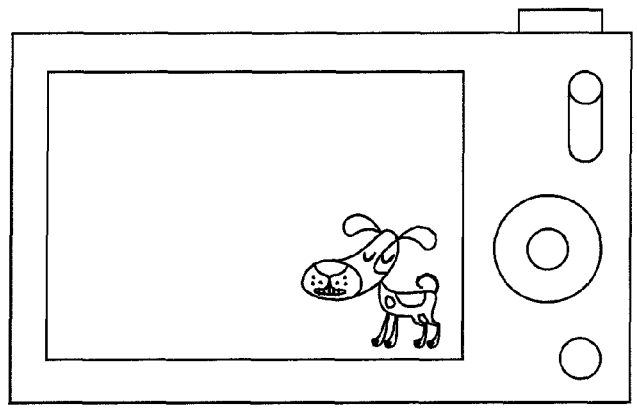
FIG. 12 is an explanatory diagram in a case where a dog is to be detected in the above embodiment; (a) of FIG. 12 is a diagram illustrating a state in which a dog is present in an image being captured; (b) of FIG. 12 is a diagram showing a candidate area; and (c) of FIG. 12 is a diagram showing an area where a detected dog is present.
Figure 12:
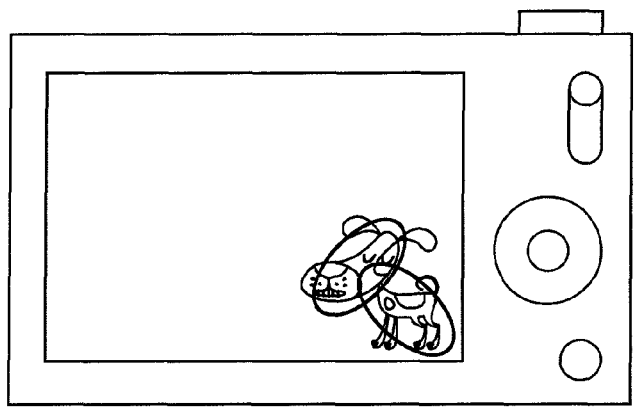
Figure 12:
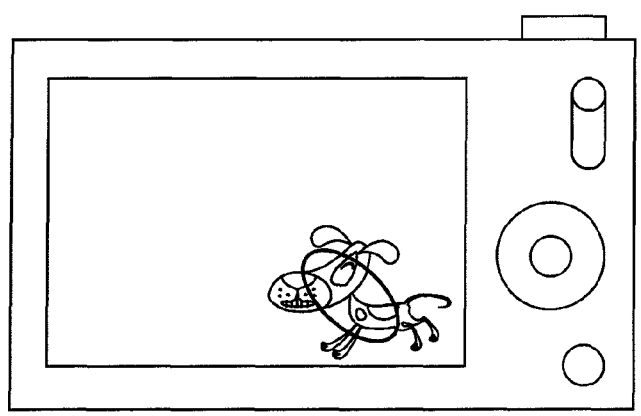

Next, the following explains an example in which the present embodiment is specifically applied, with reference to FIGS. 11 and 12. In this example, a dog is considered as the target object. FIG. 11 is an explanatory diagram in a case where a dog is registered. (a) of FIG. 11 shows a state where one point in an area where the dog is present is indicated; (b) of FIG. 11 shows a state where an area of the dog registered is discriminated.

As shown in (a) of FIG. 11, in a case where a dog is registered, first, one point in an area where the dog is present is specified as a specified point 110. Then, the dog is tracked by the method described above and a feature is extracted from the area where the dog is present (an area enclosed by a thick line). Subsequently, the feature extracted is registered.

Further, FIG. 12 is an explanatory diagram in a case where a dog is detected. (a) of FIG. 12 shows a state where the dog is present in an image being captured; (b) of FIG. 12 shows a candidate area; and (c) of FIG. 12 shows an area where the detected dog is present.

As shown in (a) of FIG. 12, when a candidate area is searched in a case where a registered dog is present in an image being captured, an area as shown in (b) of FIG. 12 is searched. Then, a feature of a candidate area searched is compared with the feature of a registered dog. If the candidate area is determined to be an area where the dog is present as a result of the comparison, display for showing the area where the dog is present is carried out as shown in (c) of FIG. 12.

The present invention is not limited to the description of the embodiments above, but may be altered by a skilled person within the scope of the claims. An embodiment based on a proper combination of technical means disclosed in different embodiments is encompassed in the technical scope of the present invention.

Each block of the digital camera 1, in particular, the control section 6 may be constituted by hardware logic or realized by software by using a CPU (central processing unit) as below.

In other words, the digital camera 1 includes a CPU that executes the order of a control program for realizing functions, a ROM (read only memory) that stores the control program, a RAM (random access memory) that develops the control program in an executable form, and a storage device (storage medium), such as memory, that stores the control program and various types of data therein. The object of the present invention can be achieved by a predetermined storage medium. The storage medium stores, in a computer-readable manner, program codes (executable code program, intermediate code program, and source program) of the control program of the digital camera 1, which is software for realizing the aforesaid functions. The storage medium is provided to the digital camera 1. With this arrangement, the digital camera 1 (alternatively, CPU or MPU (microprocessor unit)) as a computer reads out and executes the program code stored in the storage medium provided.

The storage medium may be: tape based, such as a magnetic tape or a cassette tape; disc based, such as a magnetic disk including a Floppy® disc and a hard disk, and an optical disk including a CD-ROM (compact disc read-only memory), an MO (magneto-optical), an MD (Mini Disc), a DVD (digital versatile disk), and a CD-R (CD Recordable); card based, such as an IC card (including a memory card) and an optical card; or a semiconductor memory, such as a mask ROM, an EPROM (erasable programmable read-only memory), an EEPROM (electrically erasable and programmable read-only memory), and a flash ROM.

Further, the digital camera 1 may be arranged so as to be connectable to a communications network so that the program code is supplied through the communications network. The communications network is not to be particularly limited. Examples of the communications network include the Internet, intranet, extranet, LAN (local area network), ISDN (integrated services digital network), VAN (value-added network), CATV (community antenna television) communications network, virtual private network, telephone network, mobile communications network, and satellite communications network. Further, a transmission medium that constitutes the communications network is not particularly limited. Examples of the transmission medium include (i) wired lines such as an IEEE (institute of electrical and electronic engineers) 1394 cable, a USB cable, a power-line carrier, cable TV lines, telephone lines, and ADSL (asynchronous digital subscriber loop) lines and (ii) wireless connections such as IrDA (infrared data association) and remote control using infrared light, Bluetooth®, 802.11, HDR (high data rate), mobile phone network, satellite connections, and terrestrial digital network. Note that the present invention can be also realized by the program codes in the form of a computer data signal embedded in a carrier wave which is embodied by electronic transmission.

INDUSTRIAL APPLICABILITY

According to the present invention, registration and detection of an object including an animal whose detection has been difficult conventionally can be easily carried out. Therefore, the present invention is suitably applied to a device for capturing an image of an object including an animal, for example, a digital camera.

REFERENCE SIGNS LIST 1 digital camera
2 storage section
3 operation receiving section
4 image capturing section
5 display section
6 control section
11 frame image clipping section
12 registration process section
13 tracking process section (tracking means)
14 detection process section
21 frame buffer
22 model information storage section
23 tracking information storage section
31 movement area predicting section
32 characterizing point extracting section (tacking-purpose characteristic extracting means)
33 movement amount calculating section
34 tracked object area calculating section
35 frame information updating section
36 tracking information initializing section
41, 51 frame image obtaining section (image obtaining means)
42 feature extracting section (detective feature extracting means)
43 candidate area searching section (candidate area searching means)
44 candidate area feature extracting section
45, 53 similarity level calculating section (similarity level calculating means)
46 center position calculating section (determination means)
47, 56 result outputting section (notification means)
52 detection feature extracting section (target object area detecting means, detective characteristic extracting means)
54 registration section (detective characteristic registration means)
55 adequacy level calculating section (in-motion change amount calculating means, adequacy level calculating means)
57 common feature extracting section (common characteristic specifying means)
58 initial position obtaining section (initial position obtaining means)

The invention claimed is:

1. A target object detection device for detecting a target object included in a moving image captured, the target object detection device comprising:
a storage section for storing (i) a plurality of pieces of detective characteristic information that is information for detecting the target object and also is information including color information and edge information and characterizing the target object and (ii) one or more pieces of detective common characteristic information that is common to all or a part of the plurality of pieces of detective characteristic information;
image obtaining means for obtaining a frame image in the moving image;
detective characteristic extracting means for extracting detective characteristic information from the frame image obtained by the image obtaining means;
candidate area searching means for searching a candidate area, which is smaller than the frame image and has detective characteristic information similar to the detective common characteristic information, as an area where it is possible that the target object is present in the frame image, the candidate area searching means searching the candidate area by use of the detective characteristic information extracted by the detective characteristic extracting means and the detective common characteristic information in the storage section;
similarity level calculating means for calculating a similarity level of the detective characteristic information included only in the candidate area searched by the candidate area searching means and the detective characteristic information in the storage section; and
determination means for determining that the candidate area is an area where the target object is present in the frame image, if the similarity level calculated by the similarity level calculating means exceeds a threshold.

2. The target object detection device as set forth in claim 1, further comprising:
tracking means for tracking the area where the target object is present.

3. An electronic device comprising:
the target object detection device as set forth in claim 1.

4. An electronic device comprising:
the target object detection device as set forth in claim 1; and
notification means for performing notification to a user, according to an adequacy level calculated by an adequacy level calculating means.

5. A method of controlling a target object detection device for detecting a target object included in a moving image captured, the method comprising the steps of:
(a) obtaining a frame image in the moving image;
(b) extracting detective characteristic information from the frame image obtained in the step (a);
(c) searching a candidate area, which is smaller than the frame image and has detective characteristic information similar to one piece or a plurality of pieces of detective common characteristic information, as an area where it is possible that the target object is present in the frame image, the step of searching being carried out by use of the detective characteristic information extracted in the step (b) and the one piece or the plurality of pieces of detective common characteristic information that is common to a part or all of a plurality of pieces of detective characteristic information, the plurality of pieces of detective characteristic information being information stored in a storage section and characterizing the target object, and including color information and edge information;
(d) calculating a similarity level between the detective characteristic information included only in the candidate area searched in the step (c) and the detective characteristic information stored in the storage section; and
(e) determining that the candidate area is an area where the target object is present in the frame image, if the similarity level calculated in the step (d) exceeds a threshold.

* * * * *